(12) United States Patent
Hirose et al.

(10) Patent No.: US 9,911,536 B2
(45) Date of Patent: Mar. 6, 2018

(54) DIELECTRIC COMPOSITION, DIELECTRIC ELEMENT, ELECTRONIC COMPONENT AND LAMINATED ELECTRONIC COMPONENT

(71) Applicant: EPCOS AG, Munich (DE)

(72) Inventors: Masakazu Hirose, Tokyo (JP); Tomoya Imura, Tokyo (JP); Goushi Tauchi, Tokyo (JP)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 15/509,846

(22) PCT Filed: Sep. 8, 2015

(86) PCT No.: PCT/EP2015/070475
§ 371 (c)(1),
(2) Date: Mar. 8, 2017

(87) PCT Pub. No.: WO2016/038022
PCT Pub. Date: Mar. 17, 2016

(65) Prior Publication Data
US 2017/0243696 A1    Aug. 24, 2017

(30) Foreign Application Priority Data
Sep. 9, 2014    (JP) ................ 2014-183269

(51) Int. Cl.
*C04B 35/475* (2006.01)
*H01G 4/10* (2006.01)
(Continued)

(52) U.S. Cl.
CPC ........... *H01G 4/30* (2013.01); *C04B 35/47* (2013.01); *C04B 35/475* (2013.01);
(Continued)

(58) Field of Classification Search
CPC ................ C04B 35/475; H01G 4/1227
See application file for complete search history.

(56) References Cited

U.S. PATENT DOCUMENTS 9,773,616 B2 * 9/2017 Tauchi .............. C04B 35/462
9,776,925 B2 * 10/2017 Imura ............... C04B 35/462

FOREIGN PATENT DOCUMENTS

CN    102781874 A    11/2012
JP    3334607 B2    10/2002
(Continued)

OTHER PUBLICATIONS

Machine translation of JP 200522891, Jan. 2005.*
(Continued)

*Primary Examiner* — Karl Group
(74) *Attorney, Agent, or Firm* — McDermott Will & Emery LLP

(57) ABSTRACT

The aim of the present invention lies in providing a dielectric composition which has a relatively high dielectric constant of 800 or greater, and which has relatively low dielectric loss of 4% or less when a DC bias of at least 8 V/ym is applied, and also in providing a dielectric element employing said dielectric composition, an electronic component, and a laminated electronic component. A dielectric composition having a main component represented by $(Bi_a Na_b Sr_c Ba_d)(\alpha_x Ti_{1-x})O_3$, characterized in that a is at least one selected from Zr and Sn; and a, b, c, d and x satisfy the following: $0.140 \leq a < 0.390$, $0.140 \leq b < 0.390$, $0.200 \leq c < 0.700$, $0.020 \leq d < 0.240$, $0.020 \leq x < 0.240$ and $0.950 < a+b+c+d \leq 1.050$.

6 Claims, 2 Drawing Sheets

(51) Int. Cl.
*H01G 4/30* (2006.01)
*C04B 35/47* (2006.01)
*C04B 35/626* (2006.01)
*C04B 35/634* (2006.01)
*C04B 35/64* (2006.01)
*H01G 4/12* (2006.01)

(52) U.S. Cl.
CPC ...... *C04B 35/6261* (2013.01); *C04B 35/6262* (2013.01); *C04B 35/63416* (2013.01); *C04B 35/64* (2013.01); *H01G 4/1227* (2013.01); *C04B 2235/3201* (2013.01); *C04B 2235/3213* (2013.01); *C04B 2235/3215* (2013.01); *C04B 2235/3236* (2013.01); *C04B 2235/3249* (2013.01); *C04B 2235/3293* (2013.01); *C04B 2235/3298* (2013.01); *C04B 2235/604* (2013.01); *C04B 2235/6567* (2013.01); *C04B 2235/768* (2013.01); *C04B 2235/77* (2013.01); *C04B 2235/79* (2013.01); *C04B 2235/96* (2013.01)

(56) References Cited

FOREIGN PATENT DOCUMENTS

| JP | 2003201172 | * | 7/2003 |
|----|------------|---|--------|
| JP | 2003201172 A | | 7/2003 |
| JP | 2005022891 A | | 1/2005 |

OTHER PUBLICATIONS

Xu, S. et al., "Structure, Dielectric and Electric Properties of (Ba0,68-xSr0.303Bi0.006Na0.006Mgx) (Ti0.99Sn0.01) O3 Ceramics", Journal of Alloys and Compounds, Elsevier, vol. 509, No. 6, 2011, pp. 2753-2757.

* cited by examiner

[Fig. 1]
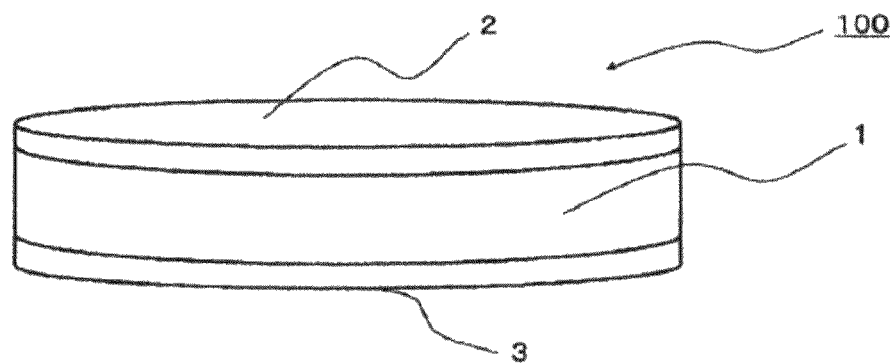
[Fig. 2]
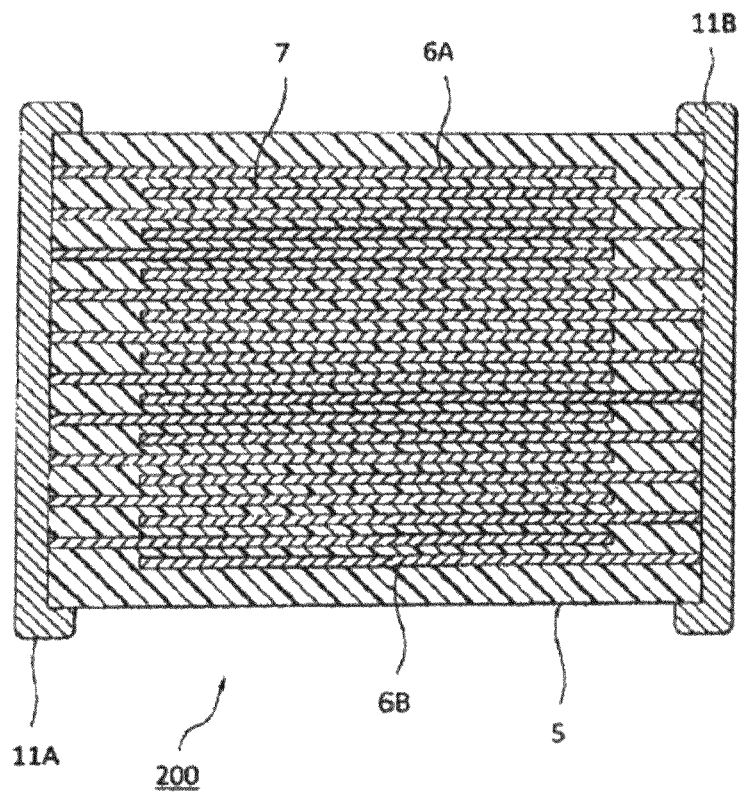

[Fig. 3]
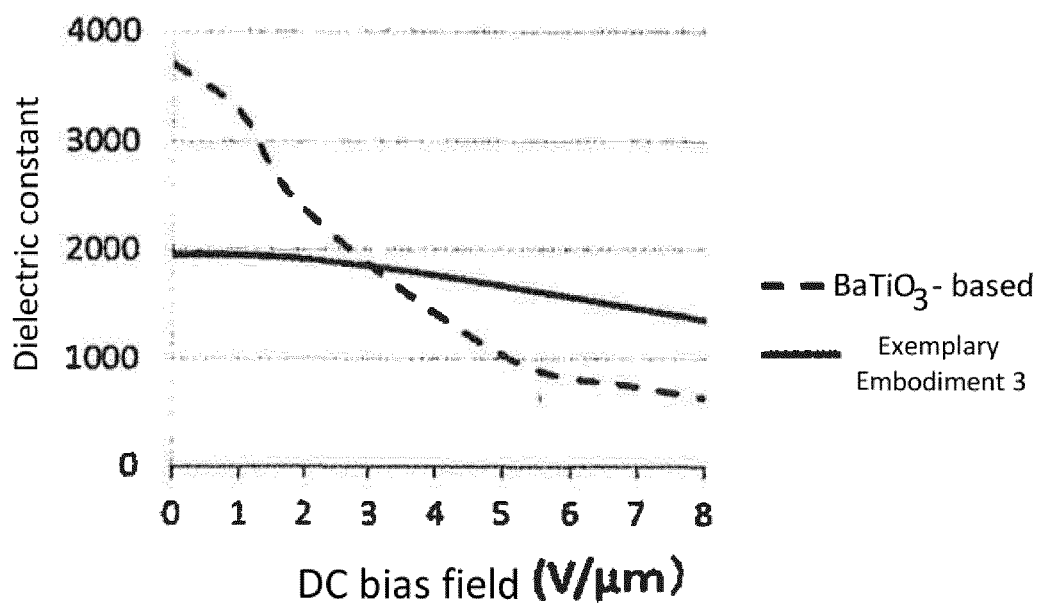

DIELECTRIC COMPOSITION, DIELECTRIC ELEMENT, ELECTRONIC COMPONENT AND LAMINATED ELECTRONIC COMPONENT

TECHNICAL FIELD

The present invention relates to a dielectric composition and a dielectric element employing same, and to an electronic component and a laminated electronic component; more specifically, the present invention relates to a dielectric composition, a dielectric element, an electronic component and a laminated electronic component which are advantageously used for medium- and high-voltage applications with a relatively high rated voltage.

PRIOR ART

In recent years there has been a great demand for miniaturization of dielectric elements as electronic circuits reach higher densities, and miniaturization of electronic components such as laminated ceramic capacitors together with increased capacity are rapidly progressing, while the applications thereof are also expanding. Various characteristics are required as this takes place.

For example, medium- and high-voltage capacitors which are used in devices such as engine control modules (ECMs), fuel injection devices, electronic control throttles, inverters, converters, high-intensity discharge (HID) headlamp units, hybrid engine battery control units and digital still cameras often have a rated voltage in excess of 100 V because they are used in circuits for providing a high voltage boost. That is to say, medium- and high-voltage capacitors such as these need a high dielectric constant when a high DC bias is applied. There is also a need at the same time for low dielectric loss when a high DC bias is applied in order to restrict self-heating of the dielectric element.

However, conventional dielectric compositions are designed on the assumption that they will be used when a low DC bias of the order of 1 V/μm is applied, for example. This means that if an electronic component having a dielectric layer comprising a conventional dielectric composition is used when a high DC bias is applied, there is a problem in that the dielectric constant is reduced. This problem becomes more marked the higher the DC bias, especially in laminated ceramic capacitors which have very thin layers, because the dielectric constant tends to decrease.

In order to solve the abovementioned problem, Patent Document 1 mentioned below describes a dielectric composition which contains a main component comprising: barium titanate having an alkali metal oxide content of 0.02 wt % or less; at least one compound selected from among europium oxide, gadolinium oxide, terbium oxide, dysprosium oxide, holmium oxide, erbium oxide, thulium oxide, and ytterbium oxide; barium zirconate, magnesium oxide and manganese oxide, said main component being represented by the following compositional formula: $\{BaO\}_m TiO_2 + \alpha R_2O_3 + \beta BaZrO_3 + \gamma MgO + gMnO$ (where $R_2O_3$ is at least one compound selected from among $Eu_2O_3$, $Gd_2O_3$, $Tb_2O_3$, $Dy_2O_3$, $Ho_2O_3$, $Er_2O_3$, $Tm_2O_3$ and $Yb_2O_3$; and α, β, γ, and g represent a mole ratio and are within the following ranges: $0.001 \le \alpha \le 0.06$, $0.005 \le \beta \le 0.06$, $0.001 < \gamma \le 0.12$, $0.001 < g \le 0.12$, $\gamma + g \le 0.13$, and $1.000 < m \le 1.035$); and said dielectric composition contains, as an auxiliary component, silicon oxide in an amount of 0.2-5.0 mol as $SiO_2$ equivalent, with respect to 100 mol of the main component.

However, a dielectric composition such as that described in Patent Document 1 has a relatively large dielectric constant when a DC bias of 5 V/μm is applied, but the dielectric constant considerably decreases when a higher DC bias of 8 V/μm is applied, so this is inadequate in terms of coping with the thinner layers accompanying the miniaturization and higher capacity of medium- and high-voltage capacitors. In addition, Patent Document 1 mentions dielectric loss, but this relates to the value when a DC bias is not applied, and there is no mention of the dielectric loss when a high DC bias of 8 V/μm is applied.

For these reasons, a dielectric composition simultaneously having a high dielectric constant and low dielectric loss when a DC bias of 8 V/μm is applied would be desirable.

PRIOR ART DOCUMENTS

Patent Documents

[Patent Document 1] JP 3334607 B2

SUMMARY OF THE INVENTION

Problem to be Solved by the Invention

In view of the situation outlined above, the aim of the present invention lies in providing a dielectric composition which is advantageously used for medium- and high-voltage applications with a relatively high rated voltage, which has a relatively high dielectric constant of 800 or greater, and which has relatively low dielectric loss of 4% or less when a DC bias of at least 8 V/μm is applied, and also in providing a dielectric element employing said dielectric composition, an electronic component, and a laminated electronic component.

Moreover, according to the present invention, a direct current electric field which is applied to the dielectric composition, dielectric element, electronic component and laminated electronic component is referred to as a DC (direct current) bias. Furthermore, the characteristic of the dielectric constant and capacitance of the dielectric composition etc. varying as a result of a DC bias being applied is referred to as the DC bias characteristics.

Means for Solving the Problem

In order to achieve the abovementioned aim, the dielectric composition according to the present invention has a main component represented by $(Bi_a Na_b Sr_c Ba_d)(\alpha_x Ti_{1-x})O_3$, and is characterized in that α is at least one selected from Zr and Sn; and a, b, c, d and x satisfy the following: $0.140 \le a \le 0.390$, $0.140 \le b \le 0.390$, $0.200 \le c \le 0.700$, $0.020 \le d \le 0.240$, $0.020 \le x \le 0.240$ and $0.950 \le a+b+c+d \le 1.050$.

It should be noted that a, b, c, d and x represent the ratio of the number of atoms of Bi, Na, Sr, Ba and α (including Zr and/or Sn) when there are three oxygen atoms.

The dielectric composition according to the present invention has the abovementioned constitution, and as a result it is possible to achieve a relatively high dielectric constant of 800 or greater and a relatively low dielectric loss of 4% or less when a DC bias of at least 8 V/μm is applied.

Preferably, a, b, c, d and x satisfy the following: $0.200 \le a \le 0.390$, $0.200 \le b \le 0.390$, $0.300 \le c \le 0.700$, $0.020 \le d \le 0.200$, $0.020 \le x \le 0.200$ and $0.950 \le a+b+c+d \le 1.050$.

A dielectric element according to the present invention comprises the abovementioned dielectric composition.

An electronic component according to the present invention is provided with a dielectric layer comprising the abovementioned dielectric composition.

A laminated electronic component according to the present invention has a laminated portion formed by alternately laminating an internal electrode layer and a dielectric layer comprising the abovementioned dielectric composition.

Advantage of the Invention

The inventive dielectric element, electronic component and laminated electronic component are advantageously used in a medium- and high-voltage capacitor with a relatively high rated voltage. The present invention makes it possible to provide a dielectric composition having a relatively high dielectric constant of 800 or greater and a relatively low dielectric loss of 4% or less when a DC bias of at least 8 V/μm is applied, and also to provide a dielectric element employing said dielectric composition, an electronic component, and a laminated electronic component.

There is no particular limitation as to the applications of the dielectric element comprising the abovementioned dielectric composition, electronic component and laminated electronic component, but they are useful in a circuit protection snubber capacitor or smoothing capacitor in which a high dielectric constant is required when a high DC bias is applied.

In addition, the dielectric composition according to the present invention has excellent characteristics without containing lead. As a result, the inventive dielectric composition, dielectric element, electronic component and laminated electronic component are outstanding from an environmental point of view.

BRIEF DESCRIPTION OF THE FIGURES

FIG. 1 is a schematic diagram of a ceramic capacitor according to a mode embodiment of the present invention;

FIG. 2 is a view in cross section of a laminated ceramic capacitor according to a different mode of embodiment of the present invention; and FIG. 3 is a graph schematically showing both a DC bias characteristics graph in accordance with an exemplary embodiment of the present invention, and a DC bias characteristics graph of a conventional $BaTiO_3$-based dielectric composition.

MODE OF EMBODIMENT OF THE INVENTION

A preferred mode of embodiment of the present invention will be described below, in some cases with reference to the figures. It should be noted that in the figures, the same reference symbols are used for elements which are the same or equivalent and a duplicate description will not be given.

As shown in FIG. 1, a single-layer ceramic capacitor 100 according to a mode of embodiment of the present invention comprises a disk-shaped dielectric body 1 and a pair of electrodes 2, 3. The single-layer ceramic capacitor 100 is obtained by forming the electrodes 2, 3 on both surfaces of the dielectric body 1. There is no particular limitation as to the shapes of the dielectric body 1 and the electrodes 2, 3. Furthermore, there is no particular limitation as to the dimensions thereof either, and suitable dimensions should be set in accordance with the application.

The dielectric body 1 is formed by a dielectric composition having a main component represented by the general formula:

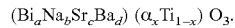
$(Bi_aNa_bSr_cBa_d)(\alpha_xTi_{1-x})O_3$.

In the abovementioned general formula, α is at least one selected from Zr and Sn. In addition, α is preferably at least Zr from the point of view of obtaining uniform crystal grains.

In the abovementioned general formula, a satisfies $0.140 \le a \le 0.390$. If a is less than 0.140 or greater than 0.390, there is a drop in dielectric constant or an increase in dielectric loss when a DC bias of 8 V/μm is applied, or compact sintering as a ceramic porcelain is not achieved.

Furthermore, a preferably satisfies $0.200 \le a \le 0.390$, and more preferably satisfies $0.213 \le a \le 0.390$. By controlling a to this kind of range, increased dielectric constant and reduced dielectric loss can be envisaged in the dielectric composition.

In the abovementioned general formula, b satisfies $0.140 \le b \le 0.390$. If b is less than 0.140 or greater than 0.390, there is a drop in dielectric constant or an increase in dielectric loss when a DC bias of 8 V/μm is applied, or compact sintering as a ceramic porcelain is not achieved.

Furthermore, b preferably satisfies $0.200 \le b \le 0.390$, and more preferably satisfies $0.213 \le b \le 0.390$. By controlling b to this kind of range, increased dielectric constant and reduced dielectric loss can be envisaged in the dielectric composition.

In the abovementioned general formula, c satisfies $0.200 \le c \le 0.700$. If c is less than 0.200 or greater than 0.700, there is a drop in dielectric constant or an increase in dielectric loss when a DC bias of 8 V/μm is applied, or compact sintering as a ceramic porcelain is not achieved.

Furthermore, c preferably satisfies $0.300 \le c \le 0.700$, and more preferably satisfies $0.400 \le c \le 0.700$. By controlling c to this kind of range, increased dielectric constant and reduced dielectric loss can be envisaged in the dielectric composition.

In the abovementioned general formula, d satisfies $0.020 \le d \le 0.240$. If d is less than 0.020 or greater than 0.240, there is a drop in dielectric constant or an increase in dielectric loss when a DC bias of 8 V/μm is applied, or compact sintering as a ceramic porcelain is not achieved.

Furthermore, d preferably satisfies $0.020 \le d \le 0.200$, and more preferably satisfies $0.020 \le d \le 0.150$. By controlling d to this kind of range, increased dielectric constant and reduced dielectric loss can be envisaged in the dielectric composition.

In the abovementioned general formula, x satisfies $0.020 \le x \le 0.240$. If x is less than 0.020 or greater than 0.240, there is a drop in dielectric constant or an increase in dielectric loss when a DC bias of 8 V/μm is applied, or compact sintering as a ceramic porcelain is not achieved.

Furthermore, x preferably satisfies $0.020 \le x \le 0.200$, and more preferably satisfies $0.020 \le x \le 0.100$. By controlling x to this kind of range, increased dielectric constant and reduced dielectric loss can be envisaged in the dielectric composition.

In addition, in the abovementioned general formula, a, b, c and d satisfy $0.950 \le a+b+c+d \le 1.050$. If a+b+c+d is less than 0.950 or greater than 1.050, it is not possible to obtain an adequate sintered density and the insulation resistance is reduced, so it is difficult to use the dielectric composition when a high DC bias is applied.

Furthermore, a, b, c and d preferably satisfy $0.980 \le a+b+c+d \le 1.050$, and more preferably satisfy $0.980 \le a+b+c+$ d≤1.020. By controlling a, b, c and d to this kind of range, increased dielectric constant and reduced dielectric loss can be envisaged in the dielectric composition.

That is to say, the dielectric composition according to this mode of embodiment makes it possible to achieve a relatively high dielectric constant of 800 or greater and a relatively low dielectric loss of 4% or less when a DC bias of 8 V/μm is applied.

The dielectric according to this mode of embodiment is a combination of ferroelectric compositions, and by providing this specific combination, it is possible to achieve a relatively high dielectric constant of 800 or greater and a relatively low dielectric loss of 4% or less when a DC bias of 8 V/μm is applied.

The content of the main component represented by the abovementioned general formula is preferably at least 90 mass % based on the dielectric composition as a whole, from the point of view of obtaining a dielectric constant which is sufficient for practical use as a dielectric composition. Furthermore, the dielectric composition may contain one or more oxides of elements selected from: Zn, Mn, Co, Ni, Al and Si, as auxiliary components in addition to the main component. In addition, the dielectric composition may include impurities such as P and Zr which may become mixed in during the production process.

The constitution of the dielectric composition may be measured by X-ray fluorescence analysis or by inductively coupled plasma (ICP) atomic emission spectroscopy.

The relative density of the abovementioned dielectric composition is preferably 95% or greater when the theoretical density is 100%. In this case, in the present specification, the relative density refers to the proportion of the actual measured value of the density with respect to the theoretical density. It should be noted that the theoretical density of the dielectric composition may be calculated using the lattice constant obtained by means of X-ray diffraction and the stoichiometric ratio obtained on the basis of perfect crystals, for example. The actual measured value of the density of the dielectric composition may be obtained by means of the Archimedes method, for example. The relative density of the dielectric composition may be adjusted by varying the firing temperature or firing time etc.

An example of a method for producing the ceramic capacitor shown in FIG. 1 will be described below.

First of all, powders of bismuth oxide ($Bi_2O_3$), sodium carbonate ($Na_2CO_3$), strontium carbonate ($SrCO_3$), barium carbonate ($BaCO_3$), zirconium oxide ($ZrO_2$), tin oxide ($SnO_2$) and titanium oxide ($TiO_2$) etc. are prepared as the starting materials of the dielectric body 1.

The abovementioned powder starting materials are then weighed out in such a way that the dielectric composition which has been fired (sintered compact) satisfies the composition of the dielectric composition according to this mode of embodiment.

The weighed starting material powders are then wet-mixed using a ball mill or the like. A calcined article is obtained by calcining the mixture obtained by wet-mixing. At this point, the calcination is normally carried out under air. Furthermore, the calcination temperature is preferably 700-900° C. and the calcination time is preferably 1-10 hours.

The resulting calcined article is wet-ground in a ball mill or the like, after which it is dried to obtain calcined powder. A binder is then added to the resulting calcined powder and press molding is performed to obtain a molded article. There is no particular limitation as to the binder which may be used provided that it is a binder which is conventionally employed in this technical field. Specific examples of binders which may be cited include polyvinyl alcohol (PVA) and the like. There is no particular limitation as to the amount of binder which is added, but an amount of 1-5 wt % is preferably added when the calcined powder is taken as 100 wt %. In addition, the molding pressure during press molding is preferably of the order of $5 \times 10^2$ MPa. There is no particular limitation as to the shape of the molded article. According to this mode of embodiment, a disk shape is formed, but a cuboid shape or another shape may equally be formed.

The dielectric body 1 is obtained by firing the resulting molded article. Here, the firing is normally carried out under air. Furthermore, the firing temperature is preferably 950-1400° C., and the firing time is preferably 2-10 hours.

The electrodes 2, 3 are then formed on both surfaces of the resulting dielectric body 1. There is no particular limitation as to the material of the electrodes, and Ag, Au, Cu, Pt, Ni or the like is used. The electrodes are formed by means of a method such as vapor deposition, sputtering, printing or electroless plating, but other methods may also be used and there is no particular limitation as to the method of forming the electrodes.

FIG. 2 is a view in cross section of a laminated ceramic capacitor according to a different mode of embodiment of the present invention. As shown in FIG. 2, a laminated ceramic capacitor 200 according to a mode of embodiment of the present invention comprises a capacitor element main body 5 having a structure in which dielectric layers 7 and internal electrode layers 6A, 6B are alternately stacked. A pair of terminal electrodes 1A, 11B which conduct, respectively, with the internal electrode layers 6A, 6B alternately arranged inside the element main body 5 are formed at both ends of the element main body 5. There is no particular limitation as to the shape of the element main body 5, but it is normally a cuboid shape. Furthermore, there is no particular limitation as to the dimensions thereof, and suitable dimensions should be set in accordance with the application.

The dielectric layers 7 comprise the dielectric composition according to this mode of embodiment.

The thickness per layer of the dielectric layers 7 may be freely set and may be 1-100 μm, for example, but there is no particular limitation.

The internal electrode layers 6A, 6B are provided in such a way as to be parallel. The internal electrode layers 6A are formed in such a way that one end thereof is exposed at the end surface of the laminated body 5 where the terminal electrode 11A is formed. Furthermore, the internal electrode layers 6B are formed in such a way that one end thereof is exposed at the end surface of the laminated body 5 where the terminal electrode 11B is formed. In addition, the internal electrode layers 6A and internal electrode layers 6B are disposed in such a way that the majority thereof is overlapping in the direction of stacking.

A metal such as Au, Pt or Ag may be used as the material of the internal electrode layers 6A, 6B, for example, but there is no particular limitation and other metals may also be used.

The terminal electrodes 11A, 11B are provided at the end surfaces of the laminated body 5 in contact with the ends of the internal electrode layers 6A, 6B which are exposed at said end surfaces. As a result, the terminal electrodes 11A, 11B are electrically connected to the internal electrode layers 6A, 6B, respectively. The terminal electrode 11A, 11B may comprise a conductive material having Ag, Au, Cu or the like as the main component thereof. The thickness of the terminal electrodes 11A, 11B is appropriately set in accordance with the application and the size of the laminated dielectric element, among other things. The thickness may be set at 10-50 μm, but there is no particular limitation.

A single-layer ceramic capacitor and a laminated ceramic capacitor in accordance with modes of embodiment of the present invention were described above. The dielectric composition according to this mode of embodiment has a high dielectric constant and low dielectric loss when a high DC bias is applied, and it can therefore be advantageously used for medium- and high-voltage capacitors with a relatively high rated voltage, for example.

Furthermore, the present invention is not limited to the modes of embodiment described above. For example, the dielectric layers comprising the dielectric composition according to this mode of embodiment may also be used as a dielectric element in a semiconductor device etc. For example, a thin-film capacitor or the like in which the dielectric composition according to the present invention is made into a thin film and incorporated on a substrate such as a semiconductor device may be cited as a dielectric element according to the present invention.

Furthermore, a known configuration may be freely used in this mode of embodiment, other than the dielectric composition. Furthermore, the calcined powder may be produced by means of a known method such as hydrothermal synthesis when the ceramic capacitor is produced. Furthermore, $(Bi_{0.5}Na_{0.5})TiO_3$, $SrTiO_3$, $BaZrO_3$ or $BaSnO_3$ etc. may also be prepared, mixed and sintered as precursors.

The dielectric according to this mode of embodiment is a combination of ferroelectric compositions, and by providing this specific combination, it is possible to achieve a relatively high dielectric constant of 800 or greater and a relatively low dielectric loss of 4% or less when a DC bias of 8 V/μm is applied.

The dielectric composition according to this mode of embodiment may also be referred to as a combination of ferroelectric compositions such as $(Bi_{0.5}Na_{0.5})TiO_3$ and $SrTiO_3$, $BaZrO_3$ and $BaSnO_3$, for example. It is possible to achieve a relatively high dielectric constant of 800 or greater and a relatively low dielectric loss of 4% or less when a DC bias of at least 8 V/μm is applied by virtue of this specific combination of ferroelectric compositions.

[Exemplary Embodiments]

The present invention will be described below in further detail with the aid of exemplary embodiments and comparative examples. However, the present invention is not limited to the following exemplary embodiments.

(Exemplary Embodiments 1-17 and Comparative Examples 1-8)

Powders of bismuth oxide ($Bi_2O_3$), sodium carbonate ($Na_2CO_3$), strontium carbonate ($SrCO_3$), barium carbonate ($BaCO_3$), zirconium oxide ($ZrO_2$), tin oxide ($SnO_2$) and titanium oxide ($TiO_2$) were prepared as starting materials.

The abovementioned powder starting materials were then weighed out in such a way that the dielectric composition which had been fired (sintered compact) satisfied the compositions shown in table 1. It should be noted here that a, b, c, d and x in table 1 represent numerical values of a, b, c, d and x, respectively, in the following general formula (1).

$$(Bi_a Na_b Sr_c Ba_d)(\alpha_x Ti_{1-x}) O_3 \quad (1)$$

The weighed starting material powders were then wet-mixed using a ball mill, after which the resulting mixture was calcined for 2 hours at 850° C. under air in order to obtain a calcined article. The resulting calcined article was wet-ground in a ball mill to obtain calcined powder. 1 wt % of PVA was then added to the calcined powder, taking the calcined powder as 100 wt %, molding was carried out at a pressure of about $5 \times 10^2$ MPa, and a disk-shaped molded article having plane dimensions of the order of diameter 17 mm and thickness 1 mm was obtained.

The resulting molded article was then fired under the air at a firing temperature of 950-1400° C. and a firing time of 2-10 hours under conditions such that the relative density was 95% or greater, in order to obtain dielectric composition samples. When the density of the resulting dielectric samples was measured, the density of all the samples was 95% or greater with respect to the theoretical density.

The compositions of the resulting dielectric composition samples were analyzed. The composition was analyzed by means of X-ray fluorescence analysis. As a result, it was confirmed that the compositions of the sintered compacts were equivalent to the compositions in table 1.

Ag electrodes were vapor-deposited on both surfaces of the resulting dielectric composition samples in order to produce capacitor samples.

The dielectric constant without DC bias application, the dielectric constant (∈) when a DC bias of 8 V/μm was applied and the dielectric loss, at room temperature of 25° C., were measured for each of the resulting capacitor samples.

A DC bias generator (Glassman High Voltage, WX10P90) was connected to a digital LCR meter (Hewlett-Packard, 4284A), and the dielectric constant and dielectric loss were measured under conditions of 1 Vrms and 1 kHz by said digital LCR meter at room temperature of 25° C. while a DC bias of 8 V/μm was applied.

The dielectric constant and dielectric loss when a DC bias of 8 V/μm was applied at room temperature of 25° C. are shown in table 1 for each dielectric composition sample according to the exemplary embodiments and comparative examples.

It should be noted that the bar lines "—" in the table indicate that the dielectric composition sample was not compactly sintered and a measurement could not be taken when a high DC bias was applied. Furthermore, in the exemplary embodiments, a dielectric constant of 800 or greater when a DC bias of 8 V/μm was applied was deemed to be good, and a dielectric constant of 900 or greater was deemed to be even better. Furthermore, a dielectric loss of 4% or less when a DC bias of 8 V/μm was applied was deemed to be good, and a dielectric loss of 3% or less was deemed to be even better.

TABLE 1

| Sample No. | Bi a | Na b | Sr c | Ba d | Ti 1 − x | Type of α Zr | Type of α Sn | X (total) | a + b + c + d | Dielectric constant @8 V/μm | Dielectric loss (%) @8 V/μm |
|---|---|---|---|---|---|---|---|---|---|---|---|
| Exemplary Embodiment 1 | 0.245 | 0.245 | 0.490 | 0.020 | 0.980 | 0.020 | 0.000 | 0.020 | 1.000 | 1489 | 1.2 |
| Exemplary Embodiment 2 | 0.238 | 0.238 | 0.474 | 0.050 | 0.950 | 0.050 | 0.000 | 0.050 | 1.000 | 1356 | 2.8 |
| Exemplary Embodiment 3 | 0.225 | 0.225 | 0.450 | 0.100 | 0.900 | 0.100 | 0.000 | 0.100 | 1.000 | 1360 | 1.2 |
| Exemplary Embodiment 4 | 0.213 | 0.213 | 0.424 | 0.150 | 0.850 | 0.150 | 0.000 | 0.150 | 1.000 | 1070 | 0.9 |

TABLE 1-continued

| Sample No. | Bi a | Na b | Sr c | Ba d | Ti 1 − x | Type of α Zr | Sn | X (total) | a + b + c + d | Dielectric constant @8 V/μm | Dielectric loss (%) @8 V/μm |
|---|---|---|---|---|---|---|---|---|---|---|---|
| Exemplary Embodiment 5 | 0.200 | 0.200 | 0.400 | 0.200 | 0.800 | 0.200 | 0.000 | 0.200 | 1.000 | 925 | 2.5 |
| Exemplary Embodiment 6 | 0.190 | 0.190 | 0.380 | 0.240 | 0.760 | 0.240 | 0.000 | 0.240 | 1.000 | 878 | 2.9 |
| Exemplary Embodiment 7 | 0.238 | 0.238 | 0.474 | 0.050 | 0.950 | 0.000 | 0.050 | 0.050 | 1.000 | 1380 | 2.5 |
| Exemplary Embodiment 8 | 0.238 | 0.238 | 0.474 | 0.050 | 0.950 | 0.025 | 0.025 | 0.050 | 1.000 | 1312 | 2.6 |
| Exemplary Embodiment 9 | 0.140 | 0.140 | 0.700 | 0.020 | 0.980 | 0.020 | 0.000 | 0.020 | 1.000 | 850 | 0.5 |
| Exemplary Embodiment 10 | 0.340 | 0.340 | 0.300 | 0.020 | 0.980 | 0.020 | 0.000 | 0.020 | 1.000 | 1318 | 2.7 |
| Exemplary Embodiment 11 | 0.390 | 0.390 | 0.200 | 0.020 | 0.980 | 0.020 | 0.000 | 0.020 | 1.000 | 820 | 3.3 |
| Exemplary Embodiment 12 | 0.300 | 0.300 | 0.200 | 0.200 | 0.800 | 0.200 | 0.000 | 0.200 | 1.000 | 865 | 3.5 |
| Exemplary Embodiment 13 | 0.200 | 0.200 | 0.500 | 0.100 | 1.000 | 0.100 | 0.000 | 0.100 | 1.000 | 1230 | 2.2 |
| Exemplary Embodiment 14 | 0.214 | 0.214 | 0.427 | 0.095 | 0.900 | 0.100 | 0.000 | 0.100 | 0.950 | 1164 | 2.0 |
| Exemplary Embodiment 15 | 0.221 | 0.221 | 0.441 | 0.097 | 0.900 | 0.100 | 0.000 | 0.100 | 0.980 | 1283 | 2.1 |
| Exemplary Embodiment 16 | 0.230 | 0.230 | 0.459 | 0.101 | 0.900 | 0.100 | 0.000 | 0.100 | 1.020 | 1255 | 1.9 |
| Exemplary Embodiment 17 | 0.236 | 0.236 | 0.473 | 0.105 | 0.900 | 0.100 | 0.000 | 0.100 | 1.050 | 1041 | 1.9 |
| Comparative Example 1 | 0.250 | 0.250 | 0.500 | 0.000 | 1.000 | 0.000 | 0.000 | 0.000 | 1.000 | 785 | 0.8 |
| Comparative Example 2 | 0.145 | 0.145 | 0.700 | 0.010 | 0.990 | 0.010 | 0.000 | 0.010 | 1.000 | 724 | 0.5 |
| Comparative Example 3 | 0.188 | 0.188 | 0.375 | 0.250 | 0.750 | 0.250 | 0.000 | 0.250 | 1.001 | 770 | 5.5 |
| Comparative Example 4 | 0.440 | 0.440 | 0.100 | 0.020 | 0.980 | 0.020 | 0.000 | 0.020 | 1.000 | 439 | 6.7 |
| Comparative Example 5 | 0.050 | 0.050 | 0.700 | 0.200 | 0.800 | 0.200 | 0.000 | 0.200 | 1.000 | 378 | 0.6 |
| Comparative Example 6 | 0.140 | 0.140 | 0.720 | 0.020 | 0.980 | 0.020 | 0.000 | 0.020 | 1.020 | 667 | 0.4 |
| Comparative Example 7 | 0.212 | 0.212 | 0.422 | 0.094 | 0.900 | 0.100 | 0.000 | 0.100 | 0.940 | — | — |
| Comparative Example 8 | 0.239 | 0.239 | 0.477 | 0.105 | 0.900 | 0.100 | 0.000 | 0.100 | 1.060 | — | — |

It can be seen from the above that the dielectric compositions of Exemplary Embodiments 1-17 for which a, b, c, d and x satisfied: $0.140 \leq a \leq 0.390$, $0.140 \leq b \leq 0.390$, $0.200 \leq c \leq 0.700$, $0.020 \leq d \leq 0.240$, $0.020 \leq x \leq 0.240$ and $0.950 \leq a+b+c+d \leq 1.050$ had a dielectric constant of 800 or greater and a dielectric loss of 4% or less when a DC bias of 8 V/μm was applied, and these compositions were in a preferred range.

In addition, the dielectric compositions of Exemplary Embodiments 1-7, 10, 11 and 13-17 for which a, b, c, d and x satisfied: $0.200 \leq a \leq 0.390$, $0.200 \leq b \leq 0.390$, $0.300 \leq c \leq 0.700$, $0.020 \leq d \leq 0.200$, $0.020 \leq x \leq 0.200$ and $0.950 \leq a+b+c+d \leq 1.050$ had a dielectric constant of 900 or greater and a dielectric loss of 3% or less when a DC bias of 8 V/μm was applied.

In contrast to this, the dielectric compositions according to Comparative Examples 1-8 which did not satisfy at least one from among $0.140 \leq a \leq 0.390$, $0.140 \leq b \leq 0.390$, $0.200 \leq c \leq 0.700$, $0.020 \leq d \leq 0.240$, $0.020 \leq x \leq 0.240$ and $0.950 \leq a+b+c+d \leq 1.050$ had a dielectric constant of less than 800 or a dielectric loss of greater than 4% when a DC bias of 8 V/μm was applied, or it was not possible to measure the dielectric constant.

In addition, a DC bias applied in the range of 0-8 V/μm was varied for the capacitor sample according to Exemplary Embodiment 3 and the dielectric constant was measured. The measurement result is shown in FIG. 3 together with an outline of the change in dielectric constant of a conventional $BaTiO_3$-based capacitor sample.

It is clear from FIG. 3 that the dielectric constant sharply dropped as the DC bias applied increased in the case of the conventional $BaTiO_3$-based capacitor sample, whereas in the case of the capacitor sample having the dielectric composition according to the invention of this application, a high dielectric constant was maintained even when the DC bias increased.

KEY TO SYMBOLS

1 Dielectric body
2, 3 Electrode
5 Laminated body
6A, 6B Internal electrode layer
7 Dielectric layer
11A, 11B Terminal electrode
100 Ceramic capacitor
200 Laminated ceramic capacitor

The invention claimed is:

1. A dielectric composition having a main component represented by $(Bi_a Na_b Sr_c Ba_d)(\alpha_x Ti_{1-x})O_3$
   characterized in that α is at least one selected from Zr and Sn; and
   a, b, c, d and x satisfy the following: $0.140 \leq a \leq 0.390$, $0.140 \leq b \leq 0.390$, $0.200 \leq c \leq 0.700$, $0.020 \leq d \leq 0.240$, $0.020 \leq x \leq 0.240$ and $0.950 \leq a+b+c+d \leq 1.050$.

2. The dielectric composition as claimed in claim 1, wherein a, b, c, d and x satisfy the following: $0.200 \leq a \leq 0.390$, $0.200 \leq b \leq 0.390$, $0.300 \leq c \leq 0.700$, $0.020 \leq d \leq 0.200$, $0.020 \leq x \leq 0.200$ and $0.950 \leq a+b+c+d \leq 1.050$.

3. A dielectric element comprising the dielectric composition as claimed in claim 1.

4. An electronic component provided with a dielectric layer comprising the dielectric composition as claimed in claim 1.

5. A laminated electronic component having a laminated portion formed by alternately laminating an internal electrode layer and a dielectric layer comprising the dielectric composition as claimed in claim 1.

6. A dielectric composition having a main component represented by $(Bi_a Na_b Sr_c Ba_d)(\alpha_x Ti_{1-x})O_3$
   characterized in that α is Sn; and
   a, b, c, d and x satisfy the following: $0.140 \leq a \leq 0.390$, $0.140 \leq b \leq 0.390$, $0.200 \leq c \leq 0.700$, $0.020 \leq d \leq 0.240$, $0.020 \leq x \leq 0.240$ and $0.950 \leq a+b+c+d \leq 1.050$.

* * * * *